Sept. 16, 1958
J. HANSEN
2,852,052
BREAD SLICING BLADE
Filed May 10, 1954
2 Sheets-Sheet 1
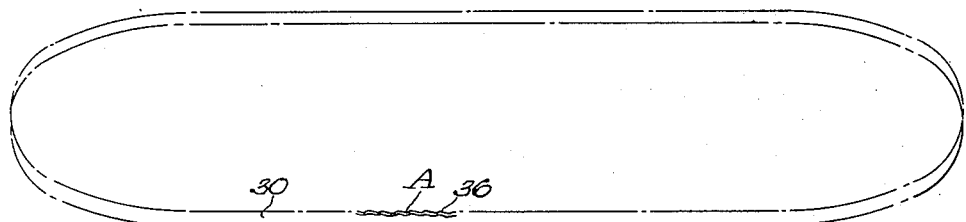
Fig. 1
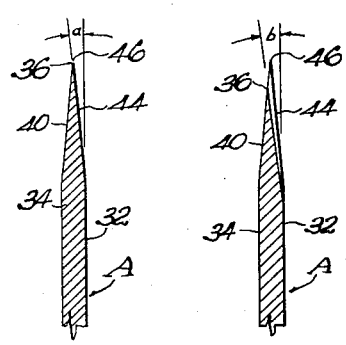
Fig. 5  Fig. 6  Fig. 7
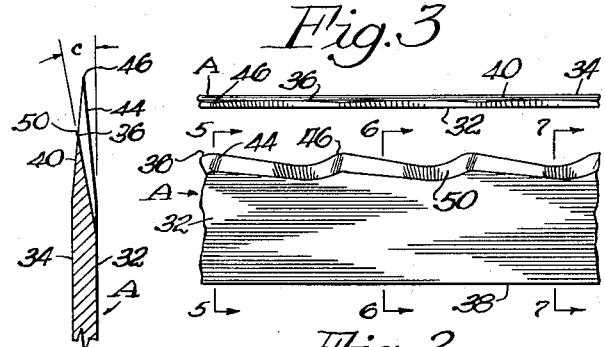
Fig. 3
Fig. 2
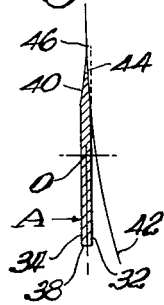
Fig. 8
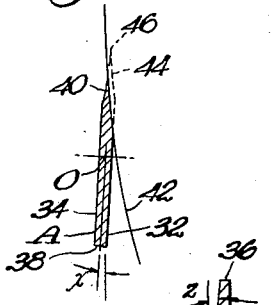
Fig. 9
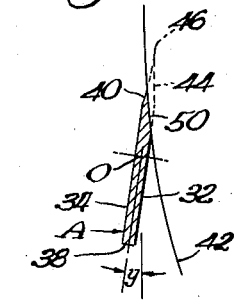
Fig. 10
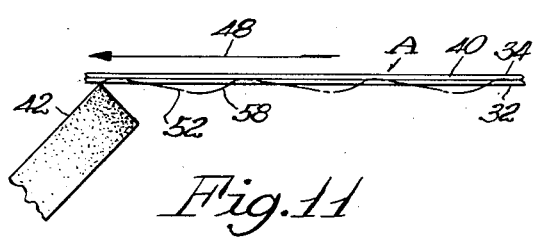
Fig. 11
Fig. 4
INVENTOR.
John Hansen
BY
Atty.

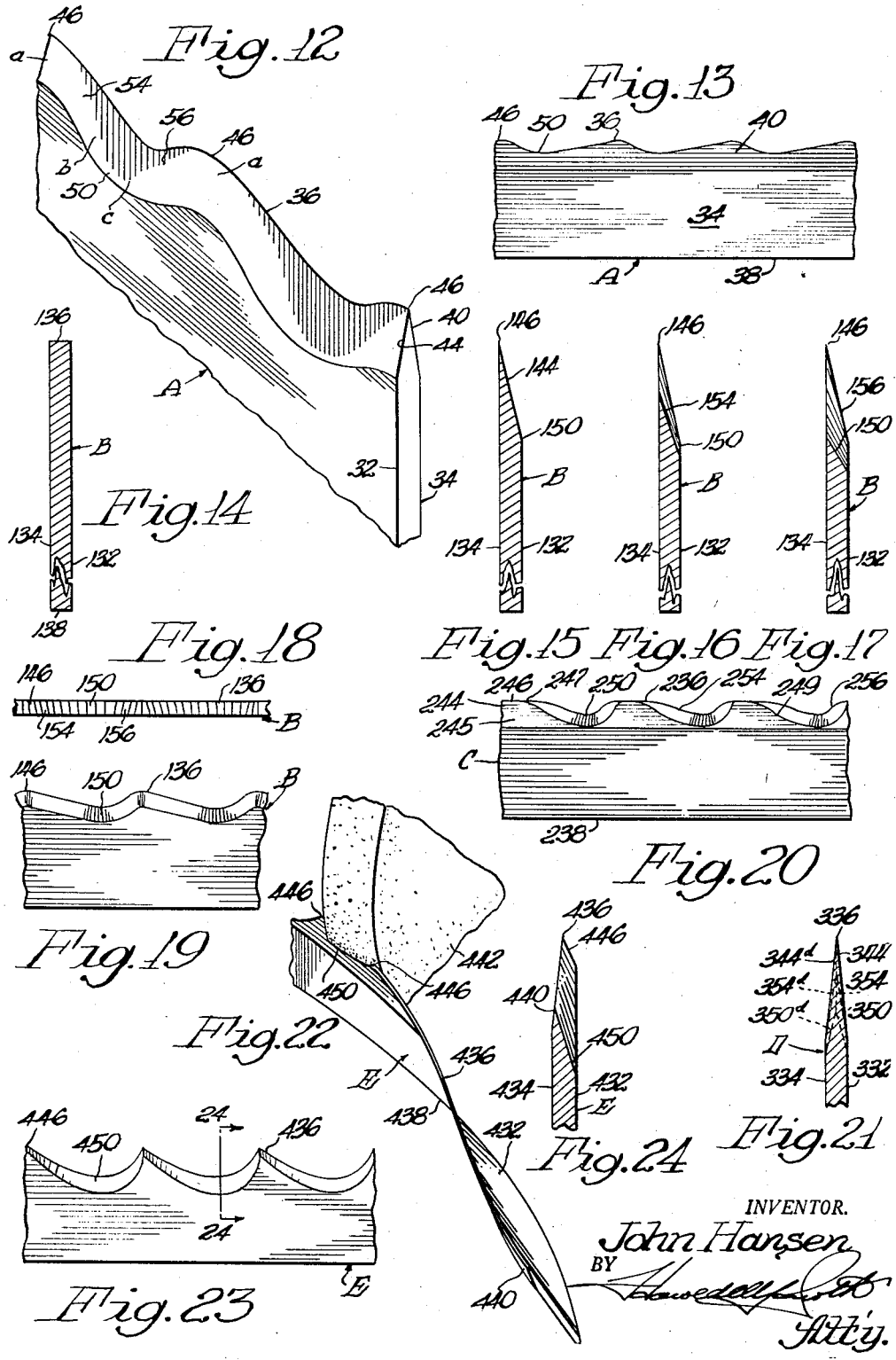

United States Patent Office 2,852,052
Patented Sept. 16, 1958

2,852,052

BREAD SLICING BLADE

John Hansen, Bettendorf, Iowa

Application May 10, 1954, Serial No. 428,533

6 Claims. (Cl. 146—88)

This invention relates to bread slicer blades and more particularly to blades of the endless or band type.

Bread when produced in large quantities is sliced by machines equipped with a plurality of blades in the form of endless bands, each band having thereon a cutting edge of one form or another and the bands being operated in such manner that they are spaced apart to cut a loaf of bread into slices of uniform thickness. For many years the industry has operated on the basis of blades patterned after that forming the subject matter of the U. S. Patent to Hansen 2,002,812, which blade is characterized by a series of symmetrical substantially arcuate scallops including valleys and sharp cutting points. The scalloping is accomplished in such manner as to leave the cutting edge relatively thick, the entire cutting edge being beveled along the peaks and valleys and at each side thereof by bevels that are at rather abrupt angles to the opposite sides of the blade. In the slicing of some types of bread, and more particularly in view of the recent trend in the industry to slice bread while it is relatively warm and soft it has been found that this blade does not have the penetration that it might have. This characteristic is attributable not only to the relatively thick cutting edge but also to the sharp lines or humps where adjacent valley bevels meet at the intervening peak. One effort aimed at the provision of a blade having greater paths of penetration forms the subject matter of U. S. patent to Hansen 2,596,851, wherein the blade is uniformly beveled at both sides to create a slimmer cutting edge and one side of the blade within one of the bevels is uniformly scalloped to produce beveled valleys. Although this cutting edge is somewhat better from the standpoint of penetration the junction of what are referred to as the primary and secondary bevels still leaves a hump or abrupt departure from a smooth surface. Moreover, the addition of the secondary bevel to one of the primary bevels grinds away steel that is needed to support the thinner cutting edge. In addition, the forming of the secondary bevel increases the cost of production.

According to the present advantages, a blade is provided in many forms that has material advantages over blades of the types heretofore known. In one form of the invention the blade is beveled on only one side and a series of helical and reverse helical bevels are added at the other side to produce a smooth sinuous bevel free from abrupt departures from an absolutely smooth surface. The formation of the bevel is such that it begins at one peak at a minimum angle to the side from which it inclines, continues downhill along the continuous valley at progressively increasing angles to said side and continues thence uphill of the valley at progressively decreasing angles to again attain a minimum angle to said side at the next adjacent peak that is spaced lengthwise of the blade from the first mentioned peak. In another form of the invention the sinuous bevel may be provided as the sole bevel on a blank strip, which places the cutting edge directly in the plane of one of the sides of the blade. In still another form of the invention the blade may have primary bevels at both sides and the sinuous bevel may be superimposed on one of the primary bevels as a secondary bevel.

Any of these forms of blade may be manufactured by a method comprising passing a strip of blade material lengthwise across the circular periphery of a grinding wheel, for example, and simultaneously moving the blade angularly toward the wheel about an axis parallel to the length of the strip, and subsequently reversing the angular movement of the strip while still in contact with the wheel, thereby forming the downhill portion of the valley at progressively increasing angles to the side of the strip that faces the wheel and subsequently in a continuing operation forming the uphill portion of the valley at progressively decreasing angles. Thus, each peak has a sharp cutting edge portion and at least that portion of the valley continuous with the peak has a sharp cutting edge portion calculated at the proper shear angle to the loaf being sliced so as to produce a clean even slice characterized by the absence of crumbing and freedom from doughballs and snow.

Other objects of the invention are to provide simplified and efficient blades that may be economically produced by mass production methods.

Still another object of the invention is to provide a blade formed by passing the blade across the face of a grinding wheel with the blade preliminarily twisted about its own axis in the form of a helix so that the valley in the edge portion thus formed is delineated by the intersection of the cylinder of the wheel and the curved portion of the blade that results from the twist.

The foregoing and other important objects and desirable features inherent in the invention will become apparent as preferred embodiments of the invention are disclosed in detail in the following description and accompanying sheets of drawings, the several figures of which will be described immediately below.

Figure 1 is a perspective view on a considerably reduced scale showing a representative form of endless blade or slicer band.

Figure 2 is a fragmentary elevational view of a portion of the band designed according to one form of the invention, the illustration being approximately twice the actual size of a blade portion.

Figure 3 is a plan view of the blade portion shown in Figure 2, being considerably exaggerated as to thickness for the purpose of clarifying the details of construction.

Figure 4 is a sectional view of the blank strip of blade material used in the manufacture of a blade like that of Figure 2.

Figures 5, 6 and 7 are respectively sectional views, enlarged approximately ten times over actual size, respectively on the lines 5—5, 6—6 and 7—7 of Figure 2.

Figures 8, 9 and 10 are combination sectional and schematic views showing successive steps in the grinding of the blade of Figure 2, the sectional blades in Figures 8, 9 and 10 corresponding to but being reduced in scale below Figures 5, 6 and 7.

Figure 11 is a schematic plan view on the scale of Figures 8, 9 and 10 showing the manner in which the blade strip is passed across the periphery of the grinding wheel.

Figure 12 is a fragmentary perspective view of the blade of Figure 2, being somewhat exaggerated to emphasize the sinuous bevel.

Figure 13 is a view from the back side of the blade shown in Figure 2.

Figure 14 is a sectional view, with a portion broken away, of a blank of blade stock from which a modified form of band is made.

Figures 15, 16 and 17 are sectional views taken at longitudinally spaced points along a blade formed from the blank of Figure 14, Figures 15, 16 and 17 corresponding generally to Figures 5, 6 and 7 as to the locations of section lines (not shown) along an elevation of the modified form of blade.

Figure 18 is a plan view on the scale of Figure 3 and showing a portion of a blade constructed as the blade of Figures 15, 16 and 17.

Figure 19 is an elevational view of the blade of Figure 18.

Figure 20 is an elevational view of a still further modified form of blade in which the peaks are somewhat straight rather than pointed.

Figure 21 is a sectional view of a blade in which sinuous bevels are ground on both sides of a blank such as that in Figure 14.

Figure 22 is a schematic illustration of the method of grinding a blade in which the blade material is twisted about its principal axis.

Figure 23 is an elevational view, on an enlarged scale, of a portion of a blade ground as in Figure 22.

Figure 24 is an enlarged fragmentary sectional view on the line 24—24 of Figure 23.

The representative illustration of the endless blade or band in Figure 1, as well as the illustration of the method in Figures 8, 9 and 10 may be considered representative of what is illustrated in Figures 1 through 21. However, for purposes of immediate description the endless band in Figure 1 will be designated generally by the numeral 30 and the scalloped or tooth portion thereof shown in full lines will be designated as blade A, which designation will be used in Figures 1 through 13.

Blade A is formed from an elongated strip of blade material such as shown in Figure 4, wherein it will be seen that the strip has first and second closely spaced apart opposite sides 32 and 34 and opposite edges 36 and 38 (Figure 2). At least one of the edges—here the edge 36—is destined to become a scalloped cutting edge as best shown in Figures 1, 2, 12 and 13. Either as a preliminary or a subsequent step, that portion of the side 34 lying marginally to the edge 36 is formed with a bevel 40 that runs throughout the length of the strip at a uniform angle to the side 34. This angle is preferably relatively small as designated by the letter Z in Figure 4, being approximately six to six and one-half degrees.

In the formation of the cutting edge that ultimately appears as shown in Figures 2 and 12 along the marginal edge portion of the opposite side 32, the blade is presented to the circular periphery of a grinding wheel 42 (Figure 8) in an initial position with the length of the blade transverse to the radial of the wheel (Figure 11) and with the edge 36 along the side 32 in such minimum contact with the periphery of the wheel that the wheel grinds a bevel 44 on said edge portion at a predetermined minimum angle to the side 32 and in a predetermined plane of convergence with the bevel 40 along the other side 34 of the blade A, to thin out the edge (Figure 5) as a peak 46. This minimum angle is designated by the letter $a$ in Figure 5 and is, like the angle Z, six to six and one-half degrees so that the included angle between the bevels 40 and 44 is twelve to thirteen degrees. Of course, in speaking of "angles," it should be appreciated that some liberty is being taken with geometric description since the bevels are actually hollow ground (although they could be straight) and it would be difficult because of the small actual size of the blade and the minute detail involved therein to conform strictly to niceties of expression. Moreover, although it is preferred that the bevels 40 and 44 converge and meet to provide a sharp point on the peak 46, the expression "converge" should also be considered descriptive of a converging relationship terminating short of a sharp point and with the actual cutting point provided as a chisel edge or in some other fashion.

Because of the dimensional relationship of the radial of the grinding wheel 42, the bevel 44 is theoretically a single line; although, in actual practice this theoretical perfection will not be achieved because the corners of the wheel will not meet on a circular line. Here again, the necessity of describing the invention in the greatest detail possible requires deference to the use of convenient and clear language, having due regard to the proposition that minor variations are on the whole somewhat immaterial. Instead of the wheel 42, a formed wheel shaped to a point at its center or otherwise could be used. In any event, because of the progressive helical and then reversely helical nature of the bevel to be formed as a continuation of the bevel 44 it will be found that line contact between the wheel and blade strip is most desirable, particularly from the standpoint of eliminating abrupt departures from a smooth surface.

The presentation of the blade strip A to the wheel 42 as shown in Figure 8 to form the bevel 44 at the peak 46 is followed immediately by the advance of the blade lengthwise thereof across the periphery of the wheel 42 as indicated by the arrow 48 in Figure 11. The blade is then simultaneously moved angularly about an axis O (Figures 8, 9 and 10), that runs parallel to the length of the blade, the direction of angular movement being such that the portion of the blade bounded by the side 32 and edge 36 is moved inwardly or toward the wheel 42. The angular movement is at progressively increasing angles $x$ and $y$ through the phases of Figures 8, 9 and 10 to attain a maximum angle $c$ at substantially the depth of a valley 50 contiguous with the peak 46, the progressive angles passing, of course, through the intermediate phase of Figure 9 at an intermediate angle $b$ (Figure 6). As the angle to the side 32 progressively increases from $a$ through $b$ and $c$, the downhill portion of the valley 50 is being formed, as represented by the portion 52 of the broken line in Figure 11. At the maximum depth of the valley 50, the direction of angular movement is reversed so that the blade, while continuing in the direction of the arrow 48, progresses through the stages of Figures 10, 9 and 8 in that order, forming the uphill portion of the valley, which terminates at the next adjacent peak 46 at which the minimum angle $a$ will again be attained. This operation is repeated throughout the desired length of the blade strip.

It is preferred that the scallops comprising the ultimate peaks and valleys 46 and 50 be formed while the blade stock is in strip form; although, the operation could as well, with slight disadvantages, be formed after the blade strip has been welded or brazed into its ultimate endless form. These details are immaterial and impose no limitations on the practice of the present invention. Furthermore, the method, as well as the design of the blade, is adapted for use in the manufacture of short reciprocating blades as distinguished from the endless type shown in Figure 1.

For the purpose of clarifying the ultimate or finished design of the blade A, reference will be had to Figure 12 and additional reference characters will be applied primarily to that figure. The peaks are there identified by the numeral 46, as already described, and the contiguous downhill portion of each valley is identified by the numeral 54, the valley reaching its maximum depth with the bevel at the maximum angle $c$ before continuing into its uphill portion 56 that ultimately merges with the next adjacent peak 46, and so on throughout the length of the blade. The shading in Figures 2 and 12, along the sinuous or helical surface bevel is intended to represent the progressive changes through the angles $a$, $b$ and $c$ and back again to $a$, the progressive change being duplicated in each scallop. The letters $a$, $b$ and $c$ are applied to Figure 12 in a general way to amplify the immediate preceding description, since the sinuous bevel, which includes the portions 54, 50 and 56, as well as the bevel portions 44 at the peaks 46, is smooth and free from abrupt surface departures and therefore can be only theoretically or descriptively broken down into separate components. This is one of the significant advantages over prior art blades, some of which, although having to some extent a thinner cutting edge, are nevertheless possessed of humps and other abrupt changes in surface. As mentioned above, the significance of the present improvement here lies in the recognition that important changes are effected on a scale bordering almost on the microscopic and that it is difficult to recognize these changes without due appreciation of the relationship between the cutting edge and the nature of the bread being cut, involving such things as the degree of resistance of the crust to penetration, the texture of the interior of the loaf, the temperature of the bread when sliced and other factors that are strictly peculiar to the bread slicing industry.

Before leaving the description of Figures 1 through 13, it should be noted that the sinuous bevel 44—54—50—56—44 (or a—b—c) constitutes a first helical or spiral portion as the forming proceeds through the phases of Figures 8, 9 and 10, as represented by the portions 52 of the sinuous path in Figure 11 and that the continuation of the surface bevel is in the nature of a reverse helix or spiral as the operation proceeds through the phases of Figures 9, 10 and 8, as represented by the portions 58 of the sinuous path in Figure 11.

The blade of Figures 14 through 19, designated for convenience as the blade B, may be from a strip of blade material as shown in Figure 14, the distinction between Figures 4 and 14 being that, although the blade strip B has opposite edges 136 and 138, it does not have a uniform primary bevel such as the bevel 40 on the blade A. Nevertheless, a sinuous bevel such as that described for the blade A may be formed on the blade B, producing on the blade B a series of peaks 146 interrupted by alternate valleys 150, the sinuous bevel progressing from a minimum angle at 144 through an intermediate angle to produce a downhill valley surface bevel 154 and an uphill valley surface bevel 156 in shape and at angles corresponding to the portions a, b, c, 44, 54, 50, 56 and 46 of the blade A. Since the formation of the bevel on the blade B is identical to the method demonstrated in Figures 8 through 11, specific repetition is deemed to be unnecessary.

Another distinction between blades A and B is that the cutting edge 136 in the blade B will lie directly in the plane of the blade side 134, since the progressively angled bevel converges with the side 134 at the cutting edge 136. Again, the expression "converge" is used in its broad sense as explained above.

A third form of blade C is shown in Figure 20, the distinction here being that the shape of the peaks and valleys 246 and 250 are generally similar to are specifically different from those of the blades A and B, thus giving the blade opposite edges 236 and 238, the edge 236 being the cutting edge. The method of Figures 8 through 11 is followed but the position of Figure 8 is maintained somewhat constant through a relatively long stage of advancement of the blade along the path 48, so that the angle of the bevel 244 at the peak 246 extends through a substantial zone 245 to give the peak 246 a relatively long straight cutting edge portion 247 as distinguished from the somewhat pointed peaks of the blades A and B. Nevertheless, the helical portions 52 and 58 of the path of Figure 11 are subsequently followed to produce a surface bevel having downhill and uphill valley portions 254 and 256, which portions include, of course, the progressions through angles a, b and c and back again to the minimum angle a, utilizing again the progression of Figures 8, 9 and 10 and the reverse progression of Figures 10, 9 and 8. The relatively sharp line at 249 in Figure 20 will be present to some extent if the change from angle a to angle b is made somewhat abruptly; although, such line will be barely visible if the change is gradual. The illustration of the line in the figure is rather for the purpose of illustrating the increased areas of the zones 245.

Figure 21 represents a fourth type of blade D which may be also considered representative of a blade in which sinuous bevels such as the sinuous bevel in blade A is ground at both sides, the blade D utilizing numerals 336 as the cutting edge, 332 and 334 as opposite sides and 344, 354 and 350 being used to designate the sinuous bevel at the side 332 and 344d, 354d and 350d, being used to designate the sinuous bevel at the opposite side. In elevation from either side, the blade D will look exactly like the one side of blade A as shown in Figure 2.

In a modified form of blade E shown in Figures 22, 23 and 24, which has opposite sides 432 and 434 and opposite edges 436 and 438, the scalloped cutting edge is formed along 436 by a method that includes twisting of the blade about its principal axis (Figure 22) and presenting the thus twisted blade to the peripheral surface of the grinding wheel 442, which results in the formation of successive scallops including ultimate peaks 446 and valleys 450, because of the delineation of each scallop by the intersection of the cylindrical surface of the wheel 442 and the curvature of the blade strip E that stems from the twisting thereof. The successive scallops are formed by repeating the operation illustrated in Figure 22.

It is another characteristic of the blade E that it has a primary bevel 440 at one side and the surface bevel 446—450 is formed along only the other side, thus requiring only two operations that may very well be accomplished simultaneously, as is the case of the blade A, thus eliminating triple grinding as required in some prior art blades.

The various attributes of the various phases of the invention have been covered in connection with the description and repetition is thought to be unnecessary. Specific features not categorically enumerated will undoubtedly occur to those versed in the art, as will certain variations and alterations that may be readily resorted to without departing from the spirit and scope of the invention.

What is claimed is:

1. A bread-slicer blade of the character described, comprising: a band in the form of a relatively thin endless strip of blade material including first and second closely spaced apart sides giving the strip its thinness and further having first and second edges spaced apart in a direction normal to the spacing of said sides to give width to the strip; at least one of said edges having a continuous scalloped cutting edge provided with alternate peaks and valleys, said peaks being of uniform height and said valleys being of uniform depth throughout the length of the band; the first side of the strip having thereon a first surface bevel running lengthwise thereof at a uniform angle to said first side to thin out said cutting edge along the peaks and valleys from a zone approximately at the depth of the valleys to the tips of the peaks so that the sides of the peaks at said first side of the strip lie in the plane of said first bevel; and the second side of the strip having thereon a single continuous ribbon-like second surface bevel of generally sinuous nature running lengthwise thereof and following the peaks and valleys, said second surface bevel, at any one peak, being inclined to said second side at a minimum angle so as to converge toward and combine with the first surface bevel at the first side of said one peak to afford a cutting edge portion at the tip of said peak, and said second surface bevel continuing from said one peak and along the adjacent valley and relatively smoothly undulating toward and away from the first surface bevel at progressively increasing angles to said second side to a maximum angle approximately at the bottom of said valley and continuing thence along said valley at progressively decreasing angles to said second side to again attain said minimum angle at the next adjacent peak, and so on throughout the extent of the band, said second surface bevel converging with the first surface bevel along each valley and combining with said first surface bevel along at least a portion of each valley contiguous with an adjacent peak to provide on each such portion a sharp cutting edge portion as a continuation of the sharp cutting edge portion on the tip of said adjacent peak.

2. The invention defined in claim 1, in which: the cutting edge portion at the tip of each peak is relatively straight and parallel to the length of the strip for an appreciable lengthwise distance before dropping into the adjacent valley; and the second surface bevel maintains approximately said minimum angle along said straight cutting edge portion before progressively increasing in angle along said adjacent valley.

3. A bread-slicer blade of the character described, comprising: a band in the form of a relatively thin endless strip of blade material including first and second closely spaced apart sides giving the strip its thinness and further having first and second edges spaced apart in a direction normal to the spacing of said sides to give width to the strip; at least one of said edges having a continuous scalloped cutting edge provided with alternate peaks and valleys, said peaks being of uniform height and said valleys being of uniform depth throughout the length of the band; at least a portion of the first side of the strip providing a first surface portion running lengthwise thereof in a common plane so that the sides of the peaks at said first side of the strip are coplanar and smooth; and the second side of the strip having thereon a single continuous ribbon-like surface bevel of generally sinuous nature running lengthwise thereof and following the peaks and valleys, said surface bevel, at any one peak, being inclined to said second side at a minimum angle so as to converge toward and combine with the surface portion at the first side of said one peak to afford a cutting edge portion at the tip of said peak, and said surface bevel continuing from said one peak and along the adjacent valley and relatively smoothly undulating toward and away from said first surface portion at progressively increasing angles to said second side to a maximum angle approximately at the bottom of said valley and continuing thence along said valley at progressively decreasing angles to said second side to again attain said minimum angle at the next adjacent peak, and so on throughout the extent of the band, said surface bevel converging with the first side surface portion along each valley and combining with said first side surface portion along at least a portion of each valley contiguous with an adjacent peak to provide on each such portion a sharp cutting edge portion as a continuation of the sharp cutting edge portion on the tip of said adjacent peak.

4. The invention defined in claim 3, in which: the cutting edge portion at the tip of each peak is relatively straight and parallel to the length of the strip for an appreciable lengthwise distance before dropping into the adjacent valley; and the surface bevel maintains approximately said minimum angle along said straight cutting edge portion before progressively increasing in angle along said adjacent valley.

5. A bread-slicer blade of the character described, comprising: a band in the form of a relatively thin endless strip of blade material including a pair of closely spaced apart sides giving the strip its thinness and further having opposite edges spaced apart in a direction normal to the spacing of said sides to give width to the strip; at least one of said edges having a continuous scalloped cutting edge provided with alternate peaks and valleys, said peaks being of uniform height and said valleys being of uniform depth throughout the length of the band; and at least one side of the strip having thereon a single continuous ribbon-like surface bevel of generally sinuous nature running lengthwise thereof and following the peaks and valleys, said surface bevel, at any one peak, being inclined to said one side at a minimum angle so as to converge toward and combine with the surface portion at the other side of the band to afford a cutting edge portion at the tip of said peak, and said surface bevel continuing from said one peak and along the adjacent valley and relatively smoothly undulating laterally of the strip at progressively increasing angles to said one side to a maximum angle approximately at the bottom of said valley and continuing thence along said valley at progressively decreasing angles to said one side to again attain said minimum angle at the next adjacent peak, and so on throughout the extent of the band, said surface bevel converging with the opposite side of the band along each valley and combining with said opposite side along at least a portion of each valley contiguous with an adjacent peak to provide on each such portion a sharp cutting edge portion as a continuation of the sharp cutting edge portion on the tip of said adjacent peak.

6. A bread-slicer blade of the character described, comprising: a band in the form of a relatively thin endless strip of blade material including first and second closely spaced apart sides giving the strip its thinness and further having first and second edges spaced apart in a direction normal to the spacing of said sides to give width to the strip; at least one of said edges having a continuous scalloped cutting edge provided with alternate peaks and valleys, said peaks being of uniform height and said valleys being of uniform depth throughout the length of the band; said first and second sides respectively having first and second surface bevels thereon, each bevel comprising a single ribbon-like bevel running lengthwise of its side and contiguously along the peaks and valleys in sinuous fashion, each bevel at any one peak being inclined to its side at a minimum angle so as to converge with the associated bevel portion at the other side of the band to afford a cutting edge portion at the tip of said peak, and each bevel continuing from said one peak and along the adjacent valley and relatively smoothly undulating laterally of said strip at progressively increasing angles to its side to attain a maximum angle at approximately the depth of said valley and continuing thence along the remainder of said valley at progressively decreasing angles to its side to again attain said minimum angle at the next peak, and so on throughout the extent of the band, said bevels converging with each other along the valleys and meeting to form a cutting edge portion on each valley at least along a part of each valley contiguous to the preceding peak.

References Cited in the file of this patent

UNITED STATES PATENTS

| | | |
|---|---|---|
| 286,706 | Kay | Oct. 16, 1883 |
| 1,750,741 | Behle | Mar. 18, 1930 |
| 2,177,316 | Giles | Oct. 24, 1939 |
| 2,535,714 | Anderson et al. | Dec. 26, 1950 |
| 2,596,851 | Hansen | May 13, 1952 |
| 2,671,267 | Michalek | Mar. 9, 1954 |